May 23, 1967  H. B. FOWLER  3,321,169
WHEEL HANDLING DEVICE
Filed Aug. 13, 1965  2 Sheets-Sheet 1
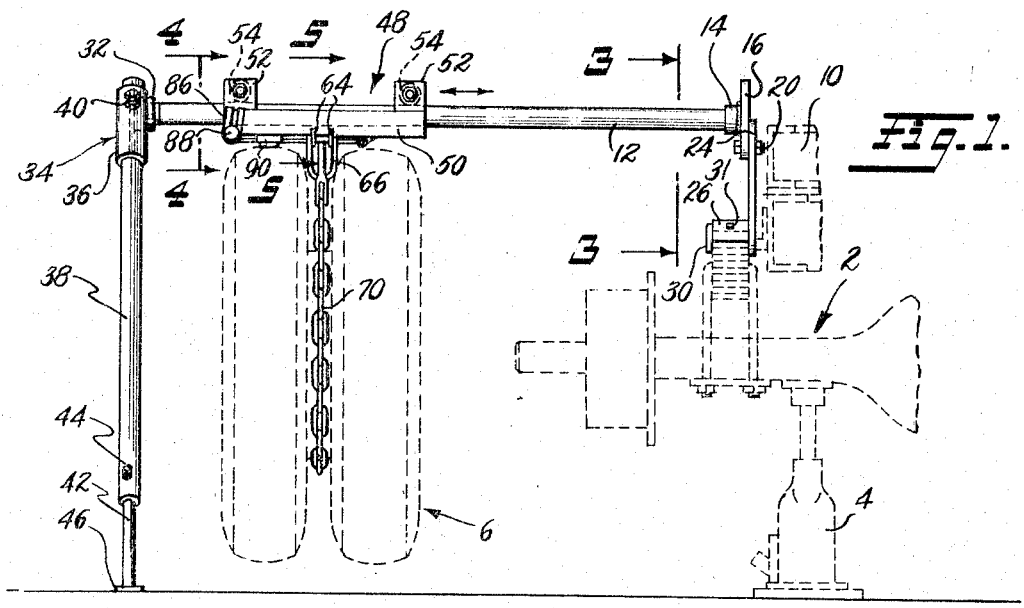
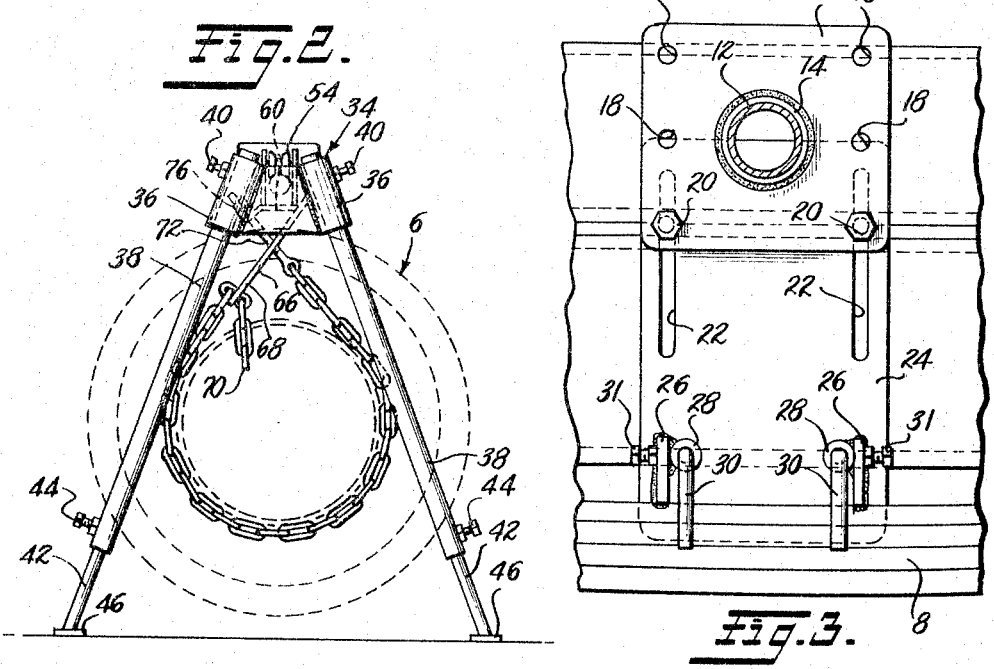
INVENTOR
Hazel B. Fowler
BY
Bacon & Thomas
ATTORNEYS May 23, 1967   H. B. FOWLER   3,321,169
WHEEL HANDLING DEVICE Filed Aug. 13, 1965   2 Sheets-Sheet 2

INVENTOR
Hazel B. Fowler

BY Bacon & Thomas

ATTORNEYS

3,321,169
WHEEL HANDLING DEVICE
Hazel B. Fowler, Box 74, Hillsboro, W. Va. 24946
Filed Aug. 13, 1965, Ser. No. 479,557
11 Claims. (Cl. 248—352)

ABSTRACT OF THE DISCLOSURE

A rail provided with ground engaging means at one end, an adjustable vehicle engaging bracket at the other end, and a wheel elevating and holding carriage movable along the rail and having a wheel steadying device.

---

This invention relates to wheel handling devices and particularly to a device for supporting the weight of dual wheels for removal from or application to the axle of a truck.

The problem of changing wheels of major size and great weight has been encountered many times and it is a difficult procedure for a man to perform without the assistance of a suitable machinery since such wheels and tires are usually of great weight and cannot normally be lifted by one man. In the past it has been proposed to construct dollies or wheel supporting devices with rollers to roll along the ground. However, due to the unevenness of the surface of the ground, such devices were not always practical and in any event, necessitated jacking the axle to a very high elevation to provide plenty of room under the wheel or the dolly or other wheel support.

The present invention avoids the above difficulties and comprises in general a rail having a bracket at one end for releasably engaging a portion of the vehicle to support that one end and legs at the other end arranged to engage the ground to support the rail generally horizontally above the axle and to extend laterally from the vehicle. A wheeled carriage is movable along the rail and is provided with means for lifting and supporting a dual wheel or other heavy wheel whereby it may readily be removed from or applied to the vehicle axle without having to jack the same to any greater height than is necessary to just lift the wheels off the ground. The invention further includes means engageable with a wheel supported by the carriage so as to hold the same against unwanted tilting movements. The apparatus is constructed of readily separable and adjustable parts whereby they may be adapted to vehicles of widely different construction and for use on uneven ground or with wheels of different diameters.

It is, therefore, an object of this invention to provide a wheel handling device that is simple in construction, economical to produce and yet rugged, reliable and efficient in operation.

Another object is to provide a wheel handling device, parts of which are readily separable for storage or transport.

Still another object is to provide a wheel handling device of the type set forth readily adjustable for use on different type vehicles and with wheels of different sizes.

A further object is to provide a device of the type set forth wherein provision is made to prevent unwanted tilting movements of a supported wheel.

Additional and still further objects and advantages will become apparent to those skilled in the art as the description proceeds with reference to the accompanying drawings wherein:

FIG. 1 is a side elevational view of a preferred embodiment of the present invention showing a portion of a truck and a dual wheel removed therefrom in phantom line;

FIG. 2 is an end elevation of the apparatus of FIG. 1 as viewed from the left end thereof;

FIG. 2A is a fragmentary detail view of a portion of the apparatus of FIG. 2;

FIG. 3 is an enlarged fragmentary sectional view taken along the line 3—3 of FIG. 1;

Figure 4:
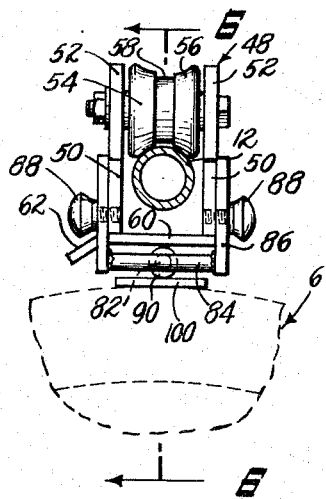
FIG. 4 is an enlarged fragmentary sectional view taken along the line 4—4 of FIG. 1.

Referring first to FIG. 1, the dotted line showing 2 represents the axle and portions of a truck supported by a jack 4 and from which a dual wheel 6 has been removed. The portions of the truck illustrated include the usual leaf spring 8 and frame members 10.

The apparatus of the invention comprises a generally horizontal rail 12, in the form of a hollow cylindrical tube or pipe. The ends of the rail 12 are preferably externally threaded and one end is received in an interiorly threaded socket 14 welded to a plate 16 extending perpendicularly across the end of the rail 12 and having a plurality of pairs of holes 18 therein (see FIG. 3). Bolts 20 are selectively placed in any of the pairs of holes 18 and passed through elongated slots 22 in a second plate 24 arranged in face-to-face relation to the outer surface of plate 16. The plate 24 has lugs 26 welded to the outer face thereof and extending transversely therefrom but spaced from the lower edge of plate 24, as seen in FIG. 3.

Figure 7:
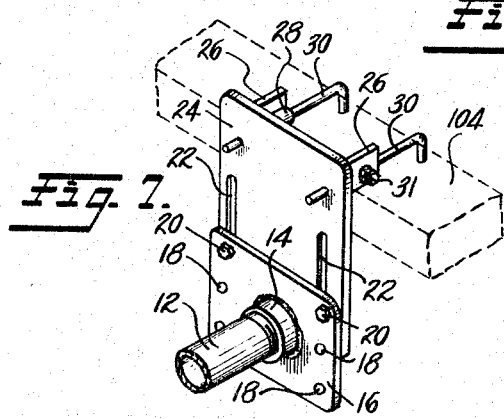
FIG. 7 is a fragmentary perspective view of a manner of adapting the apparatus for support by a different portion of a vehicle.

Adjacent each lug 26 is a tubular guide bushing 28 also welded to the plate 24 and to the lugs 26 and aligned with openings (not identified) extending through the plate 24. As is shown in FIG. 1, the lugs 26 bear upon the upper surface of the leaf spring 8 to thus support the inner end of rail 12 so that it may be vertically adjusted to the desired height. L-shaped rods 30 have a horizontal leg extending slidably through the guide bushings 28 and through plate 24 and downwardly extending outer ends which may be arranged to bear against one side of the leaf spring 8 in opposition to the downwardly projecting lower edge portion of the plate 24 whereby the adjustable bracket structure described is retained in position on the leaf spring assembly. The rods 30 are held in adjusted position by set screws 31 threaded to extend through lugs 26 and into bushings 28. When the device is used as shown in FIG. 1, the rods 33 are not necessary since the vehicle frame member 10 and a downwardly extending portion of plate 24 will satisfactorily hold the bracket in place on spring 8. However, when the device is used as illustrated in FIG. 7, to be described, the rods 30 are used.

The outer end of the rail 12 is threaded into a socket 32 on a support frame 34 which includes downwardly flared guide sleeves 36 adapted to receive tubular portions 38 of ground engaging legs. The portions 38 are retained in the sleeves 36 by means of set screws 40 or the like. Each leg 38 comprises two telescopically related elements, the lower ones, 42, being held in the desired position of adjustment in the portions 38 by set screws 44. The elements 42 are provided with feet 46 arranged to bear on the surface of the ground. Thus, it can be seen that the rail 12 may be adjusted to any desired height above the vehicle axle and may be supported to extend horizontally or tilted slightly either toward the vehicle or away therefrom, irrespective of the slope or unevenness of the ground.

A carriage designated generally at 48 is supported by the rail 12 for movement therealong. The carriage 48 comprises side members 50 having upstanding ears 52 between which rollers 54 are journalled. Each roller 54 is provided with a circumferential groove 56 (see FIG. 4) and a central peripheral recess 58. Preferably the groove 56 is conformed to be complementary in shape to the outer surface of the rail 12 but the recess 58 prevents the central portion of the rollers from engaging the uppermost surface of the rail. In this manner, high concentrations of force at the upper edge of the rail are avoided and the weight carried by the cariage is more evenly distributed over the surface of the rail, thus preventing its distortion and permitting use of lighter weight material for the rail.

Figure 5:
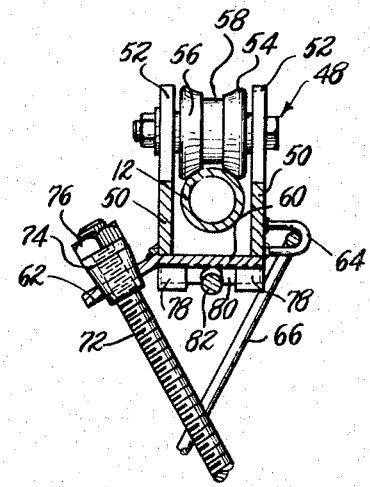
FIG. 5 is an enlarged fragmentary sectional view taken along the line 5—5 of FIG. 1.

Welded to the lowermost edges of the side plates 50 is a cross bracket 60 having an ear extending downwardly and outwardly at 62 (see FIG. 5). On the side of the carriage 48 opposite the ear 62 is a pair of eyelets 64 welded or otherwise secured to the side plate 50. A generally U-shaped bail 66 is provided with upper portions extending through the eyelets 64 whereby the bail 66 is pivotally suspended from the carriage. The lowermost end of the bail 66 is arranged to define a narrow slot portion 68 (see FIG. 2A) having an inside width just great enough to loosely receive one link of a link chain 70. As will be apparent, any selected link of the chain 70 may be placed in the narrow slot portion 68 whereupon the adjacent links of the chain will prevent the latter from sliding or moving relative to the bail 66. Thus, an initial adjustment of the length of the chain 70 may be made. The other end of chain 70 terminates in a threaded rod 72 (see FIGS. 2 and 5) extending upwardly through an opening in the ear 62 of the carriage 48. A brass bushing 74 surrounds the threaded rod 72 to prevent abrasion between the threads of the rod and the ear 62. The bushing 74 bears against the ear 62 and a nut 76 on rod 72 bears against the upper end of the bushing 74. Thus, the chain 70 may be passed around the spacer portion between the dual wheel elements of the vehicle wheel in the manner clearly shown in the drawings to support the weight of the wheel on the carriage 48 and permit its movement toward or from the vehicle axle. Obviously, any flexible filament of sufficient strength may be used instead of the link chain specifically shown.

Figure 6:
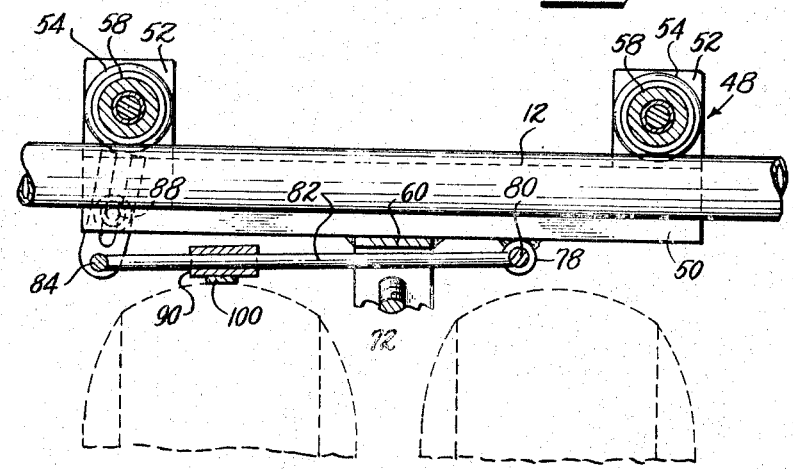
FIG. 6 is a vertical sectional view taken along the line 6—6 of FIG. 4.

Since dual wheels are not usually symmetrically constructed about the plane in which the chain extends, the wheel would be unbalanced and would tend to tilt relative to the carriage 48. Usually the inner portion of the wheel is heaviest and the top of the wheel would thus tend to fall toward the vehicle. To prevent such unwanted tilting, a brake or stabilizing means is provided. As shown in FIGS. 4-6, a pair of tubular sleeves 78 are welded to the lower edges of the side plates 50 and in alignment with each other to rotatably support a transverse rod 80. A longitudinally extending rod 82 is welded at one end to the transverse rod 80 and is welded at its other end to a second transverse rod 84. Affixed to the ends of the rod 84 are the upwardly extending slotted links 86, which extend upwardly adjacent the outer surfaces of the carriage side plates 50. Knobs 88 or the like are threaded onto studs on the side plates 50, the studs extend through the slots in links 86 and the knobs serve to clamp those links to the sides of the carriage at any selected vertical position within the range of adjustment provided and also serve as hand holds for operating the carriage. A slide element 90 slidably embraces the rod 82 and is selectively movable to any desired position therealong. As is obvious, the slide 90 may be moved along the rod 82 to a position directly above the portion of the dual wheel that tends to rise by virtue of the imbalance already described and, if desired, an intermediate member 100 may be placed on the tire of the wheel to be engaged by the slide 90, whereupon the links 86 may be moved downwardly to firmly press the slide 90 against the wheel and hold the latter against the described tilting movement.

When it is desired to remove a wheel from a truck, the axle may be first jacked up to the position suggested in FIG. 1 and the adjustable bracket 12–26 placed in such position that the lugs 26 rest upon the vehicle leaf spring 8. The plates 16 and 24 can then be adjusted so that the rail 12 extends freely across the top of the wheel to be removed with enough clearance therebetween for the carriage 48. The carriage is then moved to a position overlying the wheel and the chain 70 then wrapped around the wheel (in the manner shown) to engage the spacer already referred to. The chain may then be adjusted as to length by engaging an appropriate link thereof in the opening 68 and by turning nut 76 to transfer the weight of the wheel to the carriage. At this point the wheel may be disconnected from the axle and the carriage 48 moved outwardly along rail 12 to carry the wheel to the dotted line position of FIG. 1.

In applying such a wheel to a vehicle with the asistance of the present invention, the wheel may be first lifted by the chain 70 and thus supported by the carriage 48 outwardly of the axle, then the carriage may be moved along the rail to move the wheel into the desired position relative to the axle and without imposing the weight of the wheel thereon until the usual wheel securing means have been put in place.

While the drawings show the chain with its associated bail 66 and rod 72 arranged so that the rod 72 extends through the bail 66, obviously this particular arrangement need not be followed. The bail 66 could extend downwardly and outwardly so that the chain forms a simple cradle to support the wheel. The arrangement illustrated in the drawing wherein the rod 72 and bail 66 are arranged in crossed relationship is preferred since this prevents the suspended wheels from swinging too freely and provides greater stability therefor.

It is to be noted that the flexible filament or chain 70 is of particular utility when handling "dual wheels." The apparatus, however, is usable with single wheels by merely replacing the chain 70, or at least the lower portion thereof, with a belt or sling adapted to engage around at least the lower tread portion of the wheel.

FIG. 7 illustrates an alternative manner of supporting the rail 12 from a vehicle. In some instances the structure of the vehicle will not permit placing the lugs 26 directly on the vehicle springs; in which case the rail must be supported from some other portion of the vehicle, such as a frame member 104. To effect support from the frame member 104, it is only necessary that the bracket structure be inverted so that the lugs 26 are at the top thereof, in position to engage on the upper surface of the frame member 104. The holding rods 30 may then be projected to engage the inner edge of the frame member and clamped in such position by means of the set screws 31. When using the rail support in this manner, the vertical adjustment previously described may still be performed in the obvious manner. The plurality of pairs of openings 18 in plate 16 are selectively used with the bolts 20 and thus increase the range of adjustment previously described.

While a single specific embodiment of the invention has been shown and described herein, the same is merely illustrative of the principles involved. Other embodiments may be employed within the scope of the appended claims.

I claim:

1. A vehicle wheel handling device comprising: an elongated rail; bracket means secured to one end of said rail and removably engageable with a portion of a vehicle for supporting said one end of said rail over an axle of said vehicle; ground engaging support means at the other end of said rail to support said rail to extend generally horizontally and laterally from said vehicle above a wheel thereon; a carriage supported by and movable along said rail; and wheel elevating and supporting means depending from said carriage whereby a heavy wheel of said vehicle may be engaged and supported thereby for movement toward or from said axle; said bracket means comprising relatively adjustable members for adjusting said one end of said rail vertically relative to said vehicle.

2. A device as defined in claim 1 wherein said bracket means comprises a first plate secured across said one end of said rail in a plane perpendicular thereto; a second plate secured to the outer face of said first plate for adjustment thereon in a direction transverse to said rail; support lugs extending from one face of said second plate and adapted to rest on the upper surface of a vehicle member; and means for holding said second plate against a lateral face of said vehicle member.

3. A device as defined in claim 1 wherein said ground engaging support means comprises telescopically adjustable legs whereby the height of said other end of said rail above the ground may be adjusted to a desired elevation.

4. A device as defined in claim 1 wherein said wheel supporting means comprises a flexible member adapted to supportingly extend under a portion of a vehicle wheel; first means securing one end of said flexible member to said carriage; second means securing the other end of said flexible member to said carriage for vertical adjustment thereon whereby to lift or lower a wheel supported by said flexible member.

5. A device as defined in claim 4 wherein said flexible member comprises a link chain, said first means comprising a member adapted to supportingly engage any selected link of said chain to incrementally adjust the effective length thereof.

6. A device as defined in claim 4 wherein said second means comprises a threaded rod secured to said other end of said flexible member, and nut means on said rod engaging a portion of said carriage.

7. A device as defined in claim 1 including stabilizing means adjustably carried by said carriage and engageable with a portion of a wheel supported thereby to prevent tilting of said wheel in a vertical plane containing said rail.

8. A device as defined in claim 7 wherein said stabilizing means comprises an elongated member pivoted at one end thereof to said carriage for swinging movement in a generally vertical plane substantially parallel to said rail; means for releasably securing the other end thereof to said carriage in a selected vertical position relative thereto; and wheel engaging means selectively movable along said elongated member.

9. A device as defined in claim 1 wherein said elongated rail is a cylindrical tube, said bracket means and said ground engaging means being threadedly secured to the opposite ends thereof whereby said device may be readily disassembled for storage and easily assembled for use.

10. A device as definend in claim 1 wherein said elongated rail is a cylindrical tube, said carriage comprising supporting rollers rollable on said tube, said rollers having circumferential grooves substantially complementary to the outer surface of said tube, and central circumferential recesses, at the bottoms of said grooves, whereby said rollers do not engage said tube at the uppermost surface thereof.

11. A device as defined in claim 4 wherein said ends of said flexible member are secured to said carriage on opposite sides thereof, then extend downwardly and inwardly in crossing relation, then under said portion of said wheel whereby to dampen free swinging movements of said wheel.

References Cited by the Examiner

UNITED STATES PATENTS

| 91,243 | 6/1869 | Lozier | 214—40 |
| 1,750,663 | 3/1930 | Dart | 248—352 |
| 2,380,313 | 7/1945 | Johnson et al. | 214—1 |
| 3,048,919 | 8/1962 | Bold | 29—273 |

JOHN PETO, *Primary Examiner.*

CLAUDE A. LE ROY, *Examiner.*

J. FRANKLIN FOSS, *Assistant Examiner.*